April 26, 1938.   J. H. HUNT ET AL   2,115,072
PNEUMATIC SUSPENSION DEVICE
Filed Jan. 25, 1937   4 Sheets-Sheet 3
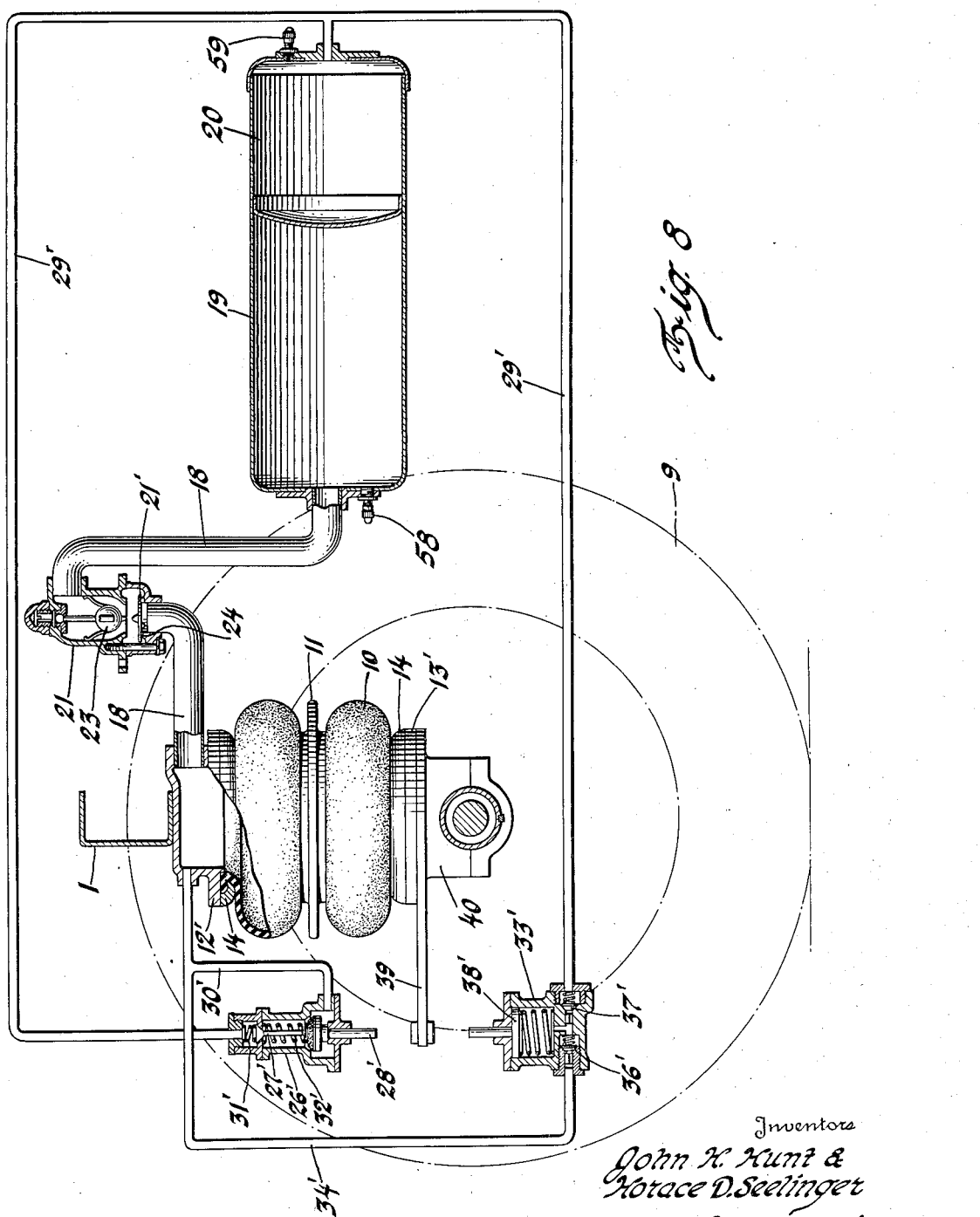

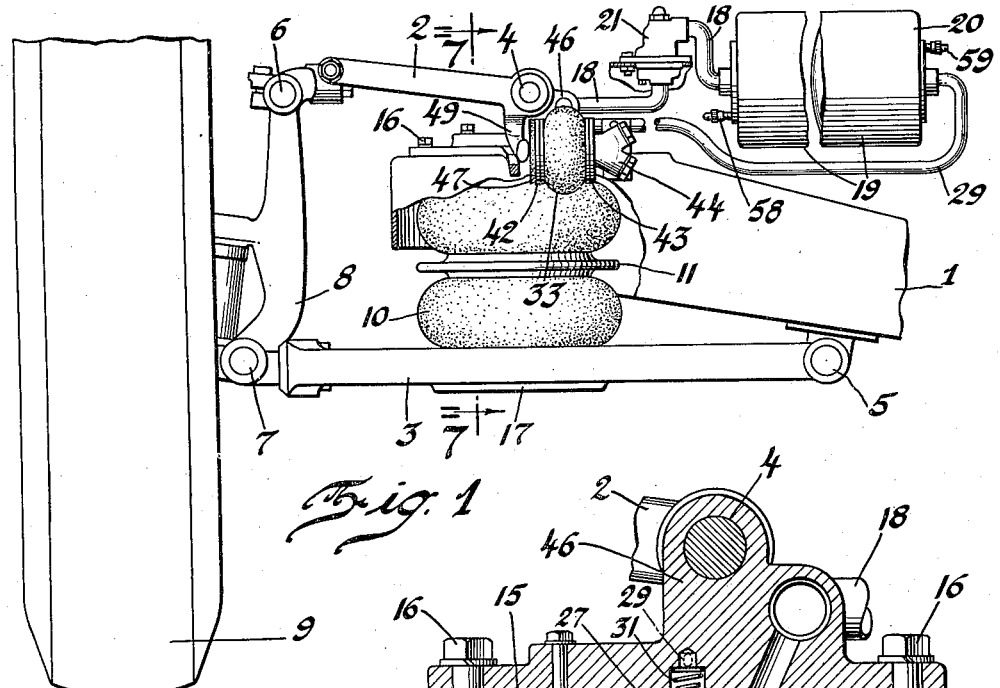

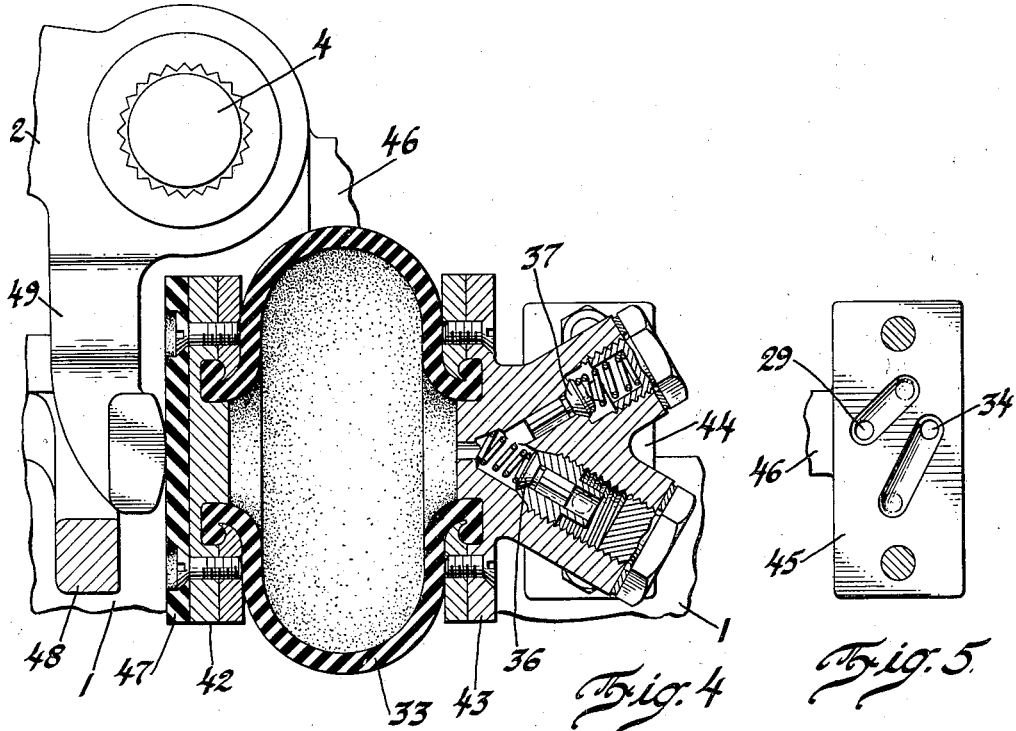
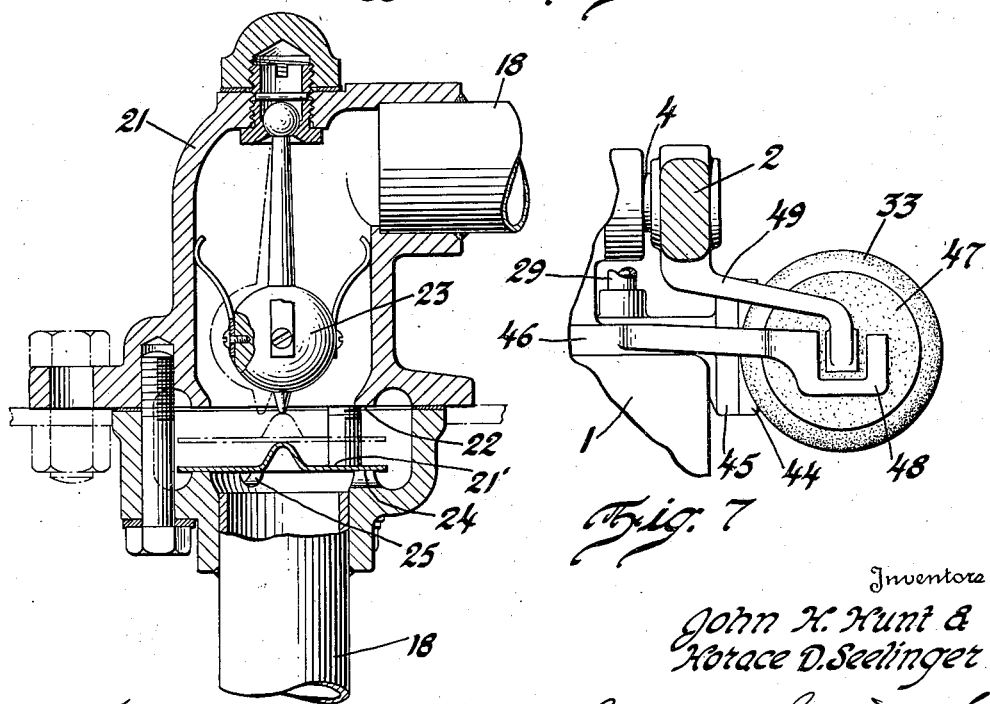

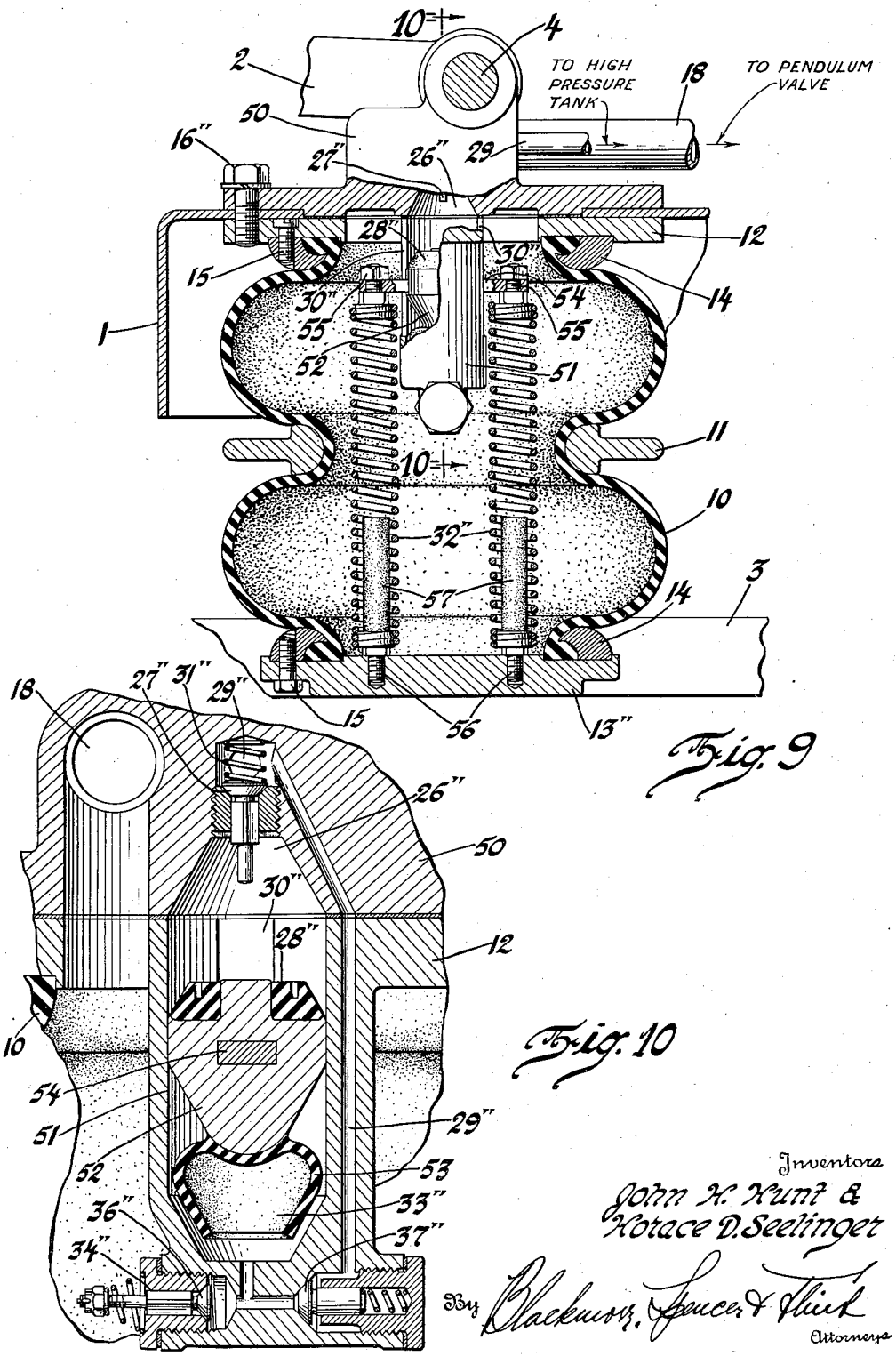

Patented Apr. 26, 1938

2,115,072

UNITED STATES PATENT OFFICE 2,115,072

PNEUMATIC SUSPENSION DEVICE

John H. Hunt, Detroit, and Horace D. Seelinger, Highland Park, Mich., assignors to General Motors Corporation, Detroit, Mich., a corporation of Delaware Application January 25, 1937, Serial No. 122,130

12 Claims. (Cl. 267—15)

This invention relates to a pneumatic suspension system for motor vehicles.

It relates particularly to such suspension system in which the resilient unit is an air cushion consisting of a highly flexible bellows of rubberized material containing air under pressure, and in which upward deflection of the wheel relatively to the vehicle frame is resiliently resisted by the compression of the air, accompanied, of course, by deformation of the flexible bellows.

Specifically, it relates to air cushion suspension systems of the foregoing type in which air under pressure from a reservoir is supplied to the air cushion through valve means designed to admit air under pressure and to exhaust air therefrom, in measured quantities, automatically in response to load variations and relative movements between the vehicle body and running gear, in order to preserve a constant standing height of the vehicle body relatively to the road.

The object of the invention is a means of regulating the pressure of the air in the flexible bellows and hence the spring rate of the unit by means including suitable valve and pump elements, automatically in accordance with the load borne by the vehicle, so as to preserve the same standing height of the vehicle frame relatively to the wheel, irrespective of the actual load borne.

A further object of the invention is to achieve the first named object by a construction in which the regulation is effected by moving air back and forth between the air cushion and a reservoir of air at high pressure forming parts of a closed system without any atmospheric opening.

Another object of the invention is a construction in which failure of the valve and pump elements will not make the air cushion inoperative.

Another object of the invention is a construction in which the pneumatic suspension means for any wheel is entirely independent of the suspension means for any other wheel.

Still another object of the invention is a construction in which there are no glands to be packed and the need for lubrication is eliminated.

The above and other objects of the invention will be apparent as the description proceeds.

According to the invention each air cushion spring means for any wheel is connected to its own reservoir of air at a pressure higher than the pressure of the air in the air cushion, through suitable measuring valve and pump means in a closed system such that high pressure air from the reservoir is measured into the air cushion with heavier loads and air from the air cushion is pumped into the reservoir with lighter loads, thus obviating the need for any atmospheric opening in the system.

In one example of a construction according to the invention the measuring or metering valve for introducing high pressure air from the reservoir into the air cushion is enclosed within the air cushion, the pump being external thereof.

In another example of a construction according to the invention the metering valve and pump are both external of the air cushion.

In yet another example the metering valve and pump are both enclosed within the air cushion.

The drawings show the application of the invention to an independent suspension system of the transverse swinging link type in which the air cushion is connected to a low pressure reservoir through a suitable pendulum controlled valve, whereby the volume of the reservoir is included with the volume of the air cushion and provides a low rate suspension, except when the pendulum is moved from its normal position and the valve closes, which occurs for instance when the vehicle rolls in cornering or dives during brake application; then the reservoir is cut off from communication with the air cushion providing a smaller volume of air under pressure and hence a higher rate to resist these tendencies.

In the drawings:

Fig. 1 is a view in elevation of a structure according to the invention in which there are two transverse swinging support links, V-shaped in plan, and the measuring or metering valve is enclosed within an air cushion operative between the lower link and the vehicle frame, the pump being external of the air cushion.

Fig. 2 is a plan view of a part of Fig. 1.

Fig. 3 is an enlarged sectional view on line 3—3 of Fig. 2.

Fig. 4 is an enlarged part sectional view on line 4—4 of Fig. 2.

Fig. 5 is an enlarged view of a part of Fig. 2 on line 5—5 of Fig. 2.

Fig. 6 is an enlarged sectional view of a part of Fig. 1.

Fig. 7 is an enlarged view on line 7—7 of Fig. 1.

Fig. 8 is a schematic diagram of the invention and shows a construction in which the metering valve and pump are both external of the air cushion.

Fig. 9 is a sectional view of a modification of the invention in which the metering valve and pump are both enclosed within the air cushion.

Fig. 10 is an enlarged sectional view on line 10—10 of Fig. 9.

Referring now particularly to Figs. 1 to 7, 1 is a part of the vehicle frame to which the spaced apart legs of the transverse swinging links 2 and 3—V-shaped in plan—are pivoted about pins 4 and 5, respectively.

Pivotally mounted on pins 6 and 7 at the outer ends of the swinging links, at the point of the V thereof, is the wheel supporting means, which in the example illustrated is a knuckle bracket 8 for the dirigible wheel 9.

Mounted between the part 1 of the vehicle frame and the lower link 3 is the air cushion 10 which is of rubber or other suitable flexible material inflated with air to carry the desired load. The air cushion has a constricted waist portion at its middle provided by the metal constricting ring 11 and is closed at its upper and lower ends by suitable metal flanges 12 and 13 to which it is clamped by the rings 14 and screws 15. The upper flange 12 is secured to the part 1 of the vehicle frame by bolts 16 and the lower flange 13 has a seating 17 on the lower V-shaped link 3.

In all the embodiments illustrated the air space within the air cushion 10 is connected by a pipe line 18 with the low pressure air reservoir 19 which is conveniently one compartment of an air reservoir having another compartment constituting a high pressure air reservoir 20.

In the pipe line 18 is a valve housing 21 within which is a valve disc 21' which normally permits a free flow of air from the air cushion 10 to the reservoir 19, and a delayed flow of air in the opposite direction.

The valve disc 21' is normally on the seat 24 unless there is an upward current of air, in which latter case and as shown in Fig. 6, the valve disc 21' is ordinarily prevented from reaching its seating 22 by the tip of the pendulum 23. The pendulum swings away from its central position when the vehicle is rounding a turn or upon sudden acceleration or deceleration, permitting the valve disc to close upwardly when there is an upward current of air acting upon its lower side consequent upon compression of the air cushion. When there is no upward current of air, or a flow in a downward direction, as when the air cushion is extended, the valve moves downwardly on to the seating 24. While in the former circumstance when the valve disc 21' is on its seating 22, there is no communication between the air cushion 10 and the reservoir 19, in the latter circumstance when the valve disc 21' is on its seating 24, a delayed flow of air from the reservoir 19 into the air cushion is permitted through a small port 25.

In Figs. 1 to 7 the high pressure air reservoir 20 is connected to a measuring chamber 26 having two spring loaded valves 27 and 28 by a duct 29. A duct 30 connects the measuring chamber 26 to the space within the air cushion. The valve 27 is opened against the resistance of a spring 31 by movement of the valve 28 beyond its closing position, the seating portion of the valve being of rubber or the like to permit of such movement. The valve 28 is normally held in an open position by spring means 32.

The space within the air cushion 10 is connected by a duct 34 to the inlet side of a pump 33, the outlet of which is connected by the duct 29 to the high pressure reservoir 20. The pump 33 is provided with a spring loaded inlet valve 36 and a spring loaded outlet valve 37.

While in the arrangement according to Figs. 1 to 7 the measuring chamber 26 is within the air cushion 10 and the pump 33 external thereof, both the measuring chamber and the pump can be arranged externally thereof as in the arrangement shown in Fig. 8, or both may be within the air cushion 10 as shown in Figs. 9 and 10.

It will be convenient now to consider Fig. 8, which, while it shows a particular arrangement, will assist in an understanding of the remaining modifications of the invention illustrated and features thereof later to be described.

In the modification according to Fig. 8, the air cushion 10 is closed at its upper and lower ends by suitable metal flanges 12' and 13'. The upper flange 12' is secured to the part 1 of the vehicle frame and the lower flange 13' is attached to the housing 40 of a wheel axle.

The high pressure air reservoir 20 is connected to the measuring chamber 26' having two spring loaded valves 27' and 28' by a duct 29'. A duct 30' connects the measuring chamber 26' to the space within the air cushion.

The valve 27' is opened against the resistance of a spring 31' by movement of the valve 28' beyond its closing position, the seating portion of the valve being of rubber or the like to permit of such movement. The valve 28' is normally held in an open position by spring means 32'.

The space within the air cushion is connected also by a duct 34' to the inlet side of a pump 33', the outlet of which is connected by the duct 29' to the high pressure reservoir 20. The pump 33' is provided with a spring loaded inlet valve 36' and a spring loaded outlet valve 37' and has a spring loaded plunger 38'.

The measuring chamber and the pump are suitably arranged on the vehicle frame with the valve 28' and the plunger 38' in positions opposite to each other to be operated respectively on sufficient upward and downward deflection of the wheel 9 relatively to the vehicle frame, through the medium of an arm 39 rigidly attached to the housing 40 of the wheel axle.

Fig. 8 is essentially a diagrammatic representation of all the embodiments of the invention illustrated. The operation of the pendulum valve 21' has already been described and the operation of the remaining elements will now be described, it being understood that the numerals 27, 28, etc. refer equally as well to the corresponding parts 27', 28', etc. or 27'', 28'', etc. of the various embodiments.

The valves 27 and 28 of the measuring chamber 26, and the pump 33 are actuated by a member partaking of the movement of the wheel 9 relatively to the vehicle frame 1. Through this member the valve 28 is closed and the valve 27 opened on sufficient upward deflection of the wheel relatively to the vehicle frame, permitting a definite quantity of high pressure air from the reservoir 20 to enter the chamber 26. As the wheel moves back to its normal position relatively to the vehicle frame the valve 27 closes and the valve 28 opens admitting a measured quantity of the higher pressure air to the air cushion chamber 10, resulting in a small increase in the pressure therein. On sufficient downward deflection of the wheel relatively to the vehicle frame, air in the pump chamber, from the air cushion 10 through the valve 36 in the duct 34, is compressed and discharged through the valve 37 into the reservoir 20 whenever the pump chamber pressure exceeds the pressure therein, this action resulting in a small decrease in the pressure in the air cushion.

Whenever the vehicle is carrying its normal load the valves 27 and 28 of the measuring chamber 26 and the pump 33 will be operated with equal frequency on bump and rebound, respectively, and the normal pressure of the air within the air cushion 10 will remain substantially unchanged.

With heavier loads than normal the valves 27 and 28 of the measuring chamber 26 will be operated with greater frequency than the pump 33, and the pressure within the air cushion 10 will be increased to sustain the greater load at the normal standing height.

With lighter loads than normal the pump 33 will be operated with greater frequency than the valves 27 and 28 of the measuring chamber 26 and the pressure within the air cushion 10 will be reduced to sustain the lesser load at the normal standing height.

The automatic adjustment for height of the vehicle frame relatively to the road will in either case continue as a result of the ordinary running oscillations of the wheel as it passes over uneven surfaces, until the condition for equilibrium in the normal standing height position of the parts obtains.

Referring now specifically to the construction according to Figs. 1 to 7. Upon sufficient upward deflection of the wheel 9 relatively to the vehicle frame, the valve 28 is moved upward and closed by contact therewith of the rubber cushion 41 mounted in the lower flange 13 of the air cushion 10. The pump 33 is a bellows of rubber or other suitable resilient and flexible material provided with end closing flanges 42 and 43. The flange 43 is part of a bracket 44 bolted to a facing 45 on a bracket 46 bolted to the vehicle frame and to the upper flange 12 of the air cushion 10 by the bolts 16. The ducts 29 and 34 in the bracket 46 are connected to the pump 33 through the valves 37 and 36, respectively, in the bracket 44. The flange 42 has on its external surface a resilient cushion 47 of rubber or the like bearing on the stop 48 (formed as part of the bracket 46) when the pump is not being actuated by the lever arm 49 on the upper pivotal wheel supporting link 2. Through the lever arm 49 the pump 33 is actuated on its delivery stroke by downward deflections of the wheel 9 relatively to the vehicle frame. The filling stroke of the pump 33 is effected by the natural resilience of the material of which it is made, which may be aided by a spring, if desired. The pump chamber will be filled through valve 36 whenever the pressure therein is less than the pressure in the air cushion 10.

In Figs. 9 and 10 the measuring chamber 26" is formed within a bracket 50 bolted to the vehicle frame and to the upper flange 12" of the air cushion 10 by the bolts 16". A chamber 51 including the pumping space 33" with its valves 36" and 37" is integral with the flange 12" and is immediately below the measuring chamber 26". Within the chamber 51 is a member 52 on the upper end of which the valve 28" is formed while at the lower end a collapsible rubber cup 53 constituting the pump plunger is attached. The member 52 is provided with a saddle 54 extending through diametrically arranged slots in the wall of the chamber 51 constituting the ducts 30" connecting the measuring chamber 26" with the space within the air cushion 10 when the valve 28" is open. Between the saddle 54 and the lower flange 13" are a pair of springs which are neither in tension nor compression in the normal position of the parts as illustrated. They are attached to the saddle 54 and to the flange 13" by suitable bolts 55 and 56, respectively, and constitute the spring means 32", normally holding the valve 28" open.

The operation of the construction according to Figs. 9 and 10, while essentially like that of the remaining embodiments, is as follows:—

Upon an upward deflection of the wheel supporting link 3 relatively to the vehicle frame, the saddle 54 with member 52 is pushed upwards by the spring means 32". If the upward movement is sufficient, the valve 28" is closed, and the valve 27" opened by contact therewith, to admit a measured quantity of high pressure air from the duct 29" into the measuring chamber 26". At the same time, the lower pressure air in the air cushion 10 is admitted to the pump chamber 33" and that part of the chamber 51 below the member 52, through the slots constituting the ducts 30". Complete closure of the coils and possible collapse of the spring means 32" is prevented by the rubber bumpers 57 within the springs and suitably attached to the bolts 56.

As the wheel supporting link 3 moves downwards during rebound to its normal position relatively to the vehicle frame, the springs of the spring means 32" lose their compression permitting the closing of valve 27" and the opening of valve 28" to admit the measured quantity of high pressure air in the chamber 26" into the air cushion 10 through the ducts 30". It should be noted that the air in the chamber 51 below the rubber cup 53 is not trapped therein until the rubber cup 53 makes contact with the bottom of the chamber 51, and that until such time both top and bottom parts of chamber 51 are in communication through the ducts 30".

Upon a downward deflection of the wheel supporting link 3 relatively to the vehicle frame the member 52 is pulled downwards by the spring means 32", until the rubber cup 53 makes contact with the bottom of the chamber 51, and seals off the pumping space 33" from the remainder of the chamber 51. With further downward movement of the member 52, the rubber cup 53 collapses and functions as a plunger, compressing and discharging air from the pumping space 33" through the valve 37" and into the high pressure duct 29" whenever the pressure therein is lower than that in the pumping space 33".

As the wheel supporting link 3 moves upwards to its normal position relatively to the vehicle frame, the spring means 32" lose their tension until they push the member 52 upwards. During this movement of the member 52, the rubber cup 53 assumes its normal shape and the valve 36" opens admitting air from the air cushion 10 through the duct 34" into the expanding pumping space 33", until the rubber cup is lifted free from the bottom of the chamber 51, and the parts are in their normal position again.

The required pressures in the reservoir compartments 19 and 20 and connected ducts are initially obtained by pumping air thereinto through the valves 58 and 59 which are conveniently of the type used for pneumatic tire inflation.

While the drawings show the application of the invention to a vehicle with front independently suspended dirigible road wheels, the invention may obviously be applied to the supporting means or road wheels of any vehicle, whether they are independently suspended or connected together by an axle or axle housing; whether at the front or rear of a vehicle; and whether or not they are dirigible wheels or driven wheels or both.

It will be apparent that a compact pneumatic suspension system has been provided with a closed air circulating circuit; in which the number of sliding parts required has been reduced to a minimum; in which the operating parts may be almost totally enclosed and protected from dust and dirt; and in which the failure of valve and pump elements will not permit the vehicle frame to sink down to the bump point.

We claim:

1. In a vehicle having an air cushion resiliently supporting the load between a road wheel supporting means and the vehicle frame, said vehicle having, for an assumed normal load, a certain standing height and normal position of the suspended parts of the vehicle relatively to the wheel supporting means and to the road, means for varying the volume and pressure of the air in the air cushion to compensate for changes in the normal load and to restore and maintain the said standing height irrespective of the changes in the normal load, said means including a reservoir of air at a higher pressure than the air in the air cushion, and means respectively responsive to upward and downward deflections of the road wheel supporting means from its normal position relatively to the vehicle frame, to admit the higher pressure air from the reservoir into the air cushion and to remove air from the air cushion into the reservoir; the total relative amounts of the air admitted into and removed from the air cushion over a number of oscillations being respectively dependent on the extent to which the oscillations are mainly above or below the normal position of the road wheel and its supporting means relatively to the vehicle frame.

2. The combination according to claim 1 in which the air cushion and the reservoir of air form parts of a closed air system without any atmospheric opening.

3. In a vehicle having an air cushion resiliently supporting the load between a road wheel supporting means and the vehicle frame, said vehicle having, for an assumed normal load, a certain standing height and normal position of the suspended parts of the vehicle relatively to the wheel supporting means and to the road, means for varying the volume and pressure of the air in the air cushion to compensate for changes in the normal load and to restore and maintain the said standing height irrespective of the changes in the normal load, said means including a reservoir of air at a higher pressure than the air in the air cushion, a measuring device consisting of a measuring chamber with valves cooperative to admit a measured quantity of high pressure air from the reservoir into the air cushion each time the valves are actuated, and a pump for pumping air from the air cushion into the reservoir.

4. The combination according to claim 3 in which the said measuring device and pump are actuated automatically by means responsive respectively to running oscillations of the road wheel and its supporting means upwardly and downwardly from their normal positions relatively to the vehicle frame.

5. The combination according to claim 3, in which the said measuring device and the pump are automatically actuated respectively by means responsive to the running oscillations of the road wheel and its supporting means upwardly and downwardly from their normal position relatively to the vehicle frame, and the total quantity of air admitted through the measuring chamber into the pneumatic suspension means is unequal to the quantity pumped therefrom in a given number of oscillations, whenever and only when the said oscillations take place through a range which extends unequally on either side of that position of the wheel supporting means corresponding to the said standing height for the assumed normal load.

6. The combination according to claim 3 in which the air cushion, the reservoir of air, the measuring device and the pump form parts of a closed air system without any atmospheric opening.

7. The combination according to claim 3 in which the measuring chamber complete with its valves is enclosed within the air cushion.

8. The combination according to claim 3 in which the measuring device and pump are enclosed within the air cushion.

9. The combination according to claim 3 in which the valves for the measuring chamber comprise an inlet valve for the ingress of air thereinto from the high pressure reservoir, and an outlet valve for the egress of air therefrom into the pneumatic suspension means, the inlet valve being opened by movement of the outlet valve beyond its closing position, and being closed before the opening of the outlet valve.

10. The combination according to claim 3, in which the road wheel is independently supported by a pair of upper and lower transverse swinging links pivoted to the vehicle frame, and the pump is actuated on its delivery stroke, upon downward deflections of the wheel relatively to the vehicle frame, by a lever arm on the upper link.

11. The combination according to claim 3 in which the measuring chamber and the pump chamber are within the air cushion and are constituted respectively by the opposite ends of a single chamber rigidly attached to one end of the air cushion; said single chamber being divided into a measuring chamber and a pump chamber by a movable member having attachments constituting an outlet valve for the air chamber and a plunger for the pump chamber; said movable member being actuated by a relative movement of the opposite end of the air cushion, through the medium of spring means resiliently connecting the movable member thereto.

12. The combination according to claim 3 in which a low pressure reservoir is connected to the air cushion through a suitable pendulum controlled valve, such that in the normal position of the pendulum, the air in the low pressure reservoir forms part of the total volume of air resiliently supporting the load, to provide a low rate suspension; the said valve being permitted to close upon movement of the pendulum from its normal position, as when the vehicle rolls in cornering or dives during brake application, at which times the low pressure reservoir is cut off from communication with the air cushion to provide a lesser volume of air under pressure and hence a higher rate suspension, to reduce the degree of roll or dive.

JOHN H. HUNT.
HORACE D. SEELINGER.